United States Patent
Menzies et al.

(10) Patent No.: US 7,908,157 B1
(45) Date of Patent: Mar. 15, 2011

(54) REINSURANCE PARTICIPATION PLAN

(75) Inventors: Steven M. Menzies, Omaha, NE (US);
Jeffrey A. Silver, Omaha, NE (US);
Sidney R. Ferenc, Omaha, NE (US);
Justin N. Smith, Woodside, CA (US);
Sean Hughes, Belmont, CA (US)

(73) Assignee: Applied Underwriters, Inc., Omaha, NE (US)

( * ) Notice: Subject to any disclaimer, the term of this patent is extended or adjusted under 35 U.S.C. 154(b) by 0 days.

(21) Appl. No.: 12/822,371

(22) Filed: Jun. 24, 2010

Related U.S. Application Data

(63) Continuation of application No. 12/696,256, filed on Jan. 29, 2010.

(60) Provisional application No. 61/148,560, filed on Jan. 30, 2009.

(51) Int. Cl.
*G06Q 40/00* (2006.01)

(52) U.S. Cl. .......................................................... 705/4

(58) Field of Classification Search .................. 705/1–45
See application file for complete search history.

(56) References Cited

U.S. PATENT DOCUMENTS

| | | | |
|---|---|---|---|
| 5,590,037 A | 12/1996 | Ryan et al. | |
| 5,712,984 A | 1/1998 | Hammond et al. | |
| 5,752,236 A | 5/1998 | Sexton et al. | |
| 6,226,625 B1 | 5/2001 | Levenstein | |
| 6,604,080 B1 | 8/2003 | Kern | |
| 7,359,863 B1 | 4/2008 | Evenshaug et al. | |
| 7,516,079 B2 | 4/2009 | Harrison et al. | |
| 7,565,302 B2 | 7/2009 | Best-Devereux | |
| 7,693,731 B1 | 4/2010 | Weber et al. | |
| 7,698,213 B2 | 4/2010 | Lancaster | |
| 2003/0074277 A1 | 4/2003 | Foutz | |
| 2008/0027762 A1 | 1/2008 | Herzfeld et al. | |
| 2008/0052135 A1 | 2/2008 | Ziade et al. | |
| 2008/0306779 A1 | 12/2008 | Thomas et al. | |
| 2009/0012840 A1 | 1/2009 | Gaubatz et al. | |
| 2009/0192829 A1 | 7/2009 | Long et al. | |
| 2010/0010837 A1 | 1/2010 | Lang et al. | |
| 2010/0036684 A1 | 2/2010 | McNamee et al. | |

OTHER PUBLICATIONS

Crouse, Charles,W. "On Non-Linear Retrospective Rating", Proceedings of the Casualty of Actuarial Society, Nov. 18, 1949 pp. 35-62.

(Continued)

*Primary Examiner* — Rajesh Khattar
(74) *Attorney, Agent, or Firm* — Mark Nowotarski

(57) ABSTRACT

A reinsurance participation plan allows an insurance carrier to provide novel loss participation plans to insureds. The insurance carrier cedes a portion of the risk to a reinsurance company, such as a captive reinsurance company. The captive reinsurance carrier then enters into a contractual agreement with the insured for the participation plan, subject to the appropriate regulations for the primary line of insurance in question. The participation plan may be a non-linear participation plan, such as a curvilinear participation plan, where the non-linearities allow the plan to be offered to smaller companies than would otherwise qualify for more traditional retrospective participation plans, and to provide more advantageous plans to larger companies than they would otherwise be offered. The plans may be offered on a multi-year basis with particular diligence in informed consent for the prospective insured. Plans may be offered to small companies whose loss experience is aggregated and then divided according to relative premium amounts among the small companies such that the aggregate losses have a distribution with skewness comparable to that of a medium sized company.

8 Claims, 15 Drawing Sheets

OTHER PUBLICATIONS

Lee, Yoong-Sin, "The Mathematics of Excess of Loss Coverages and Retrospective Rating—A Graphical Approach", Proceedings of the Casualty of Actuarial Society, vol. LXXV, No. 143 & 144, 1988 pp. 49-77.

Brosius, Eric, J. "Table M Construction", Casualty Actuarial Society (study note) 2002.

Cai, Jyn, Tan, Ken Seng, Weng, Changguo, and Zhang, Yi., "Optimal Reinsurance Under VaR and CTE Risk Measures", Article, Insurance:Mathematic and Economics, Elsevier B.V. Mar. 2007.

Carlson, Thomas, O. "An Actuarial Analysis of Retrospective Rating", Proceedigs of the Casualty Actuarial Society vol. XXVIII, Nov. 14, 1941.

Gillam, W.R.; and Snader, R.H., "Fundamentals of Individual Risk Rating," National Council on Compensation Insurance (Study Note), 1992, Part I. Revised Oct. 1, 2002.

Gillam, W.R.; and Snader, R.H., "Fundamentals of Individual Risk Rating," National Council on Compensation Insurance (Study Note), 1992, Part II.

Gillam, W.R.; and Snader, R.H., "Fundamentals of Individual Risk Rating," National Council on Compensation Insurance (Study Note), 1992 Part III.

Hewitt, C.C. Jr, 'Loss Ratio Distribution , A Model', Proceedigs of the Casualty Actuarial Society vol. LIV , 1967, Year Book 1968.

"Large Risk Alternative Rating Opiton", Filing Memorandum, The Workers' Compensation Rating and Inspection Bureau of Massachusetts, Jan. 7, 1993.

"Retrospective Rating Plan", Web page, The Workers' Compensation Rating and Inspection Bureau of Massachusetts, Jun. 30, 2009.

Mahler, Howard, C., "The Interaction of Maximum Premiums, Minimum Premiums and Accident Limits in Retrospective Rating", Proceedings of the Casualty Actuarial Society vol. LXIII. 1976.

"CompVision System, rating plans", P&C Insurance Systems, Inc. Mar. 15, 2005.

Perryman, F.S. "Written Disccusion On Non-Linear Retrospective Rating, Charles W. Crouse" Proceedigs of the Casualty Actuarial Society, Nov. 17, 1950.

Perryman, F.S. "Possible Values for Retrospective Rating Plans", Proceedings of the Casualty Actuarial Society vol. XXXI, Nov. 1, 1944.

"Retrospective Rating Plan Manual, State special Rules", Manual, Massachusetts, Apr. 1, 1995 , copyright material of the National Council on compensation Insurance 1994.

Simon, Leroy, J. "The 1965 Table M", Proceeedings, of the Casualty Actuarial Society May 1965 vol. LII part I.

Teng, Michael and Perkins, Miriam, "Estimating the Premium Asset on Retrospectively Rated Policies", Apr. 8, 2004.

Vandewalle, B. & Beirlant, J. "On Univariate Extreme Value Statistics and the Estimation of Reinsurance Premiums" Article, Insurance:Mathematic and Economics, Elsevier B.V. Jul. 2005.

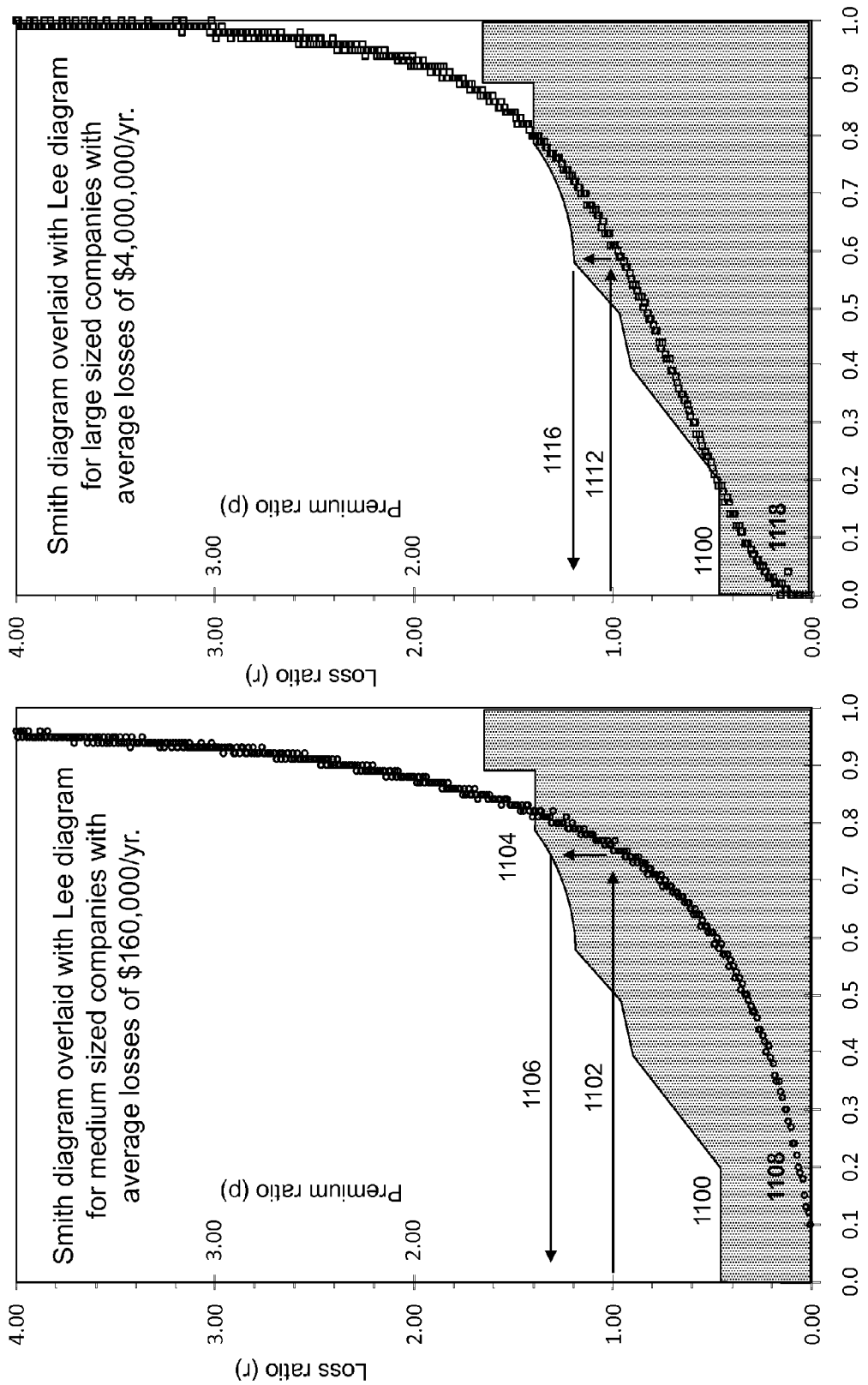

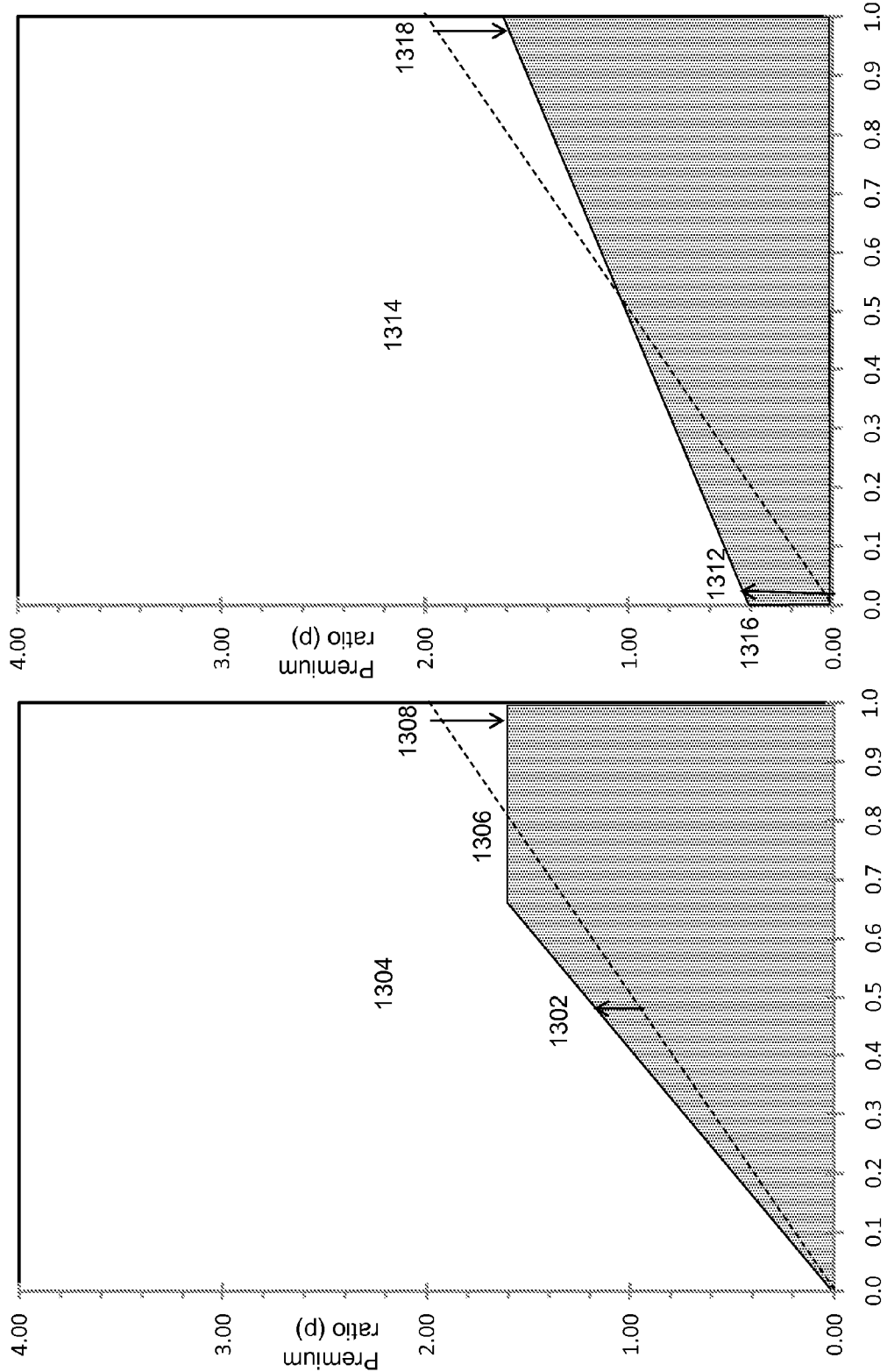

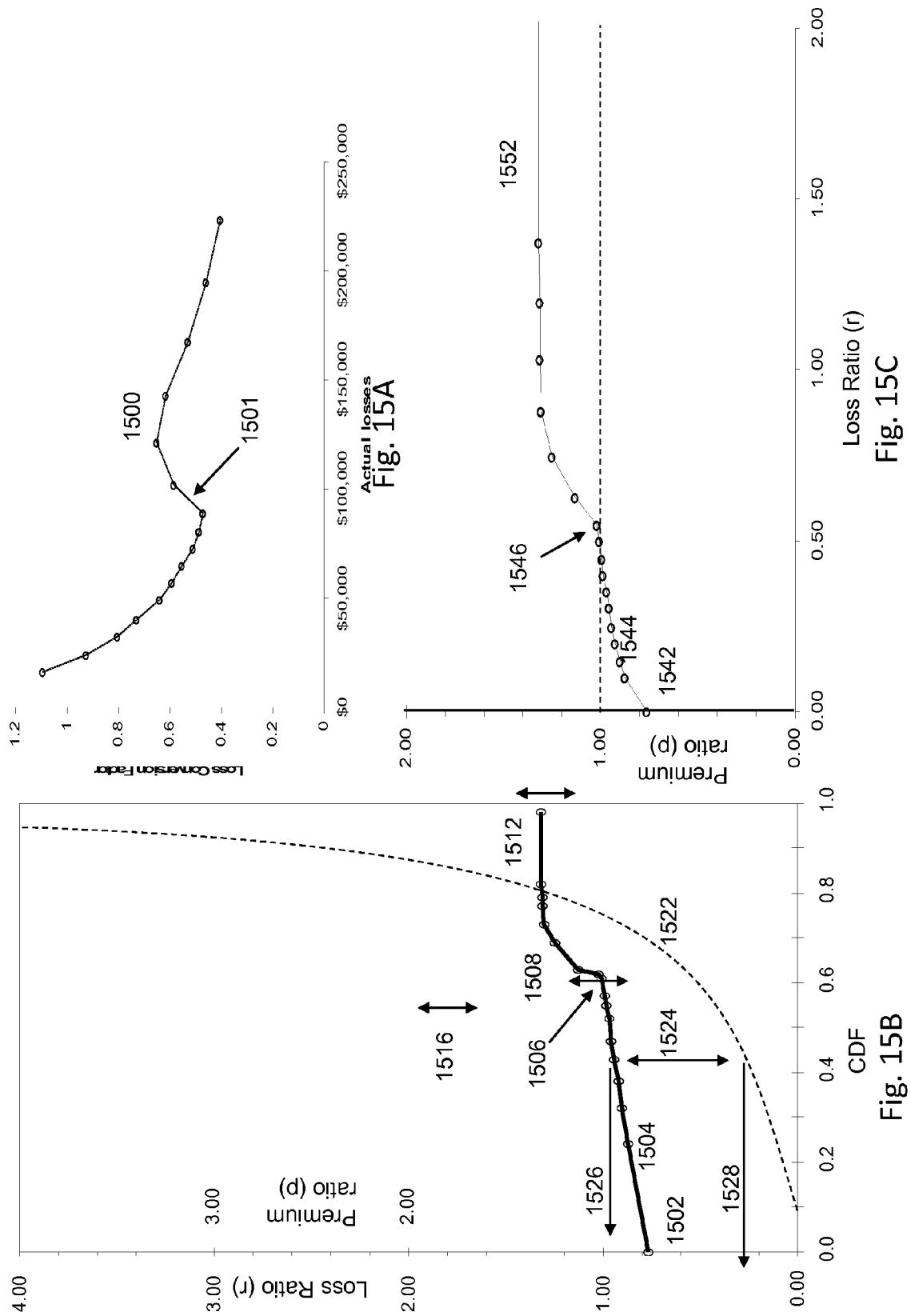

REINSURANCE PARTICIPATION PLAN

CROSS-REFERENCE TO RELATED APPLICATION

This application is a continuation of U.S. nonprovisional patent application "Reinsurance Participation Plan", Ser. No. 12/696,256, filed Jan. 29, 2010. Said application is incorporated in its entirety herein by reference.

Said nonprovisional patent application Ser. No. 12/696,256, in turn, claims the benefit of U.S. provisional patent application "Reinsurance Participation Plan", Ser. No. 61/148,560, filed Jan. 30, 2009. Said application is incorporated in its entirety herein by reference.

Said continuation application hereby claims priority from said nonprovisional patent application Ser. No. 12/696,256 and said provisional patent application Ser. No. 61/148,560.

FIELD OF INVENTION

This disclosure is generally in the field of insurance.

BACKGROUND

There is long felt need for an insurance product that more closely matches an insured's perception of the risk of suffering various levels of aggregate loss and preferences regarding different final cost outcomes.

SUMMARY OF THE INVENTION

The Summary of the Invention is provided as a guide to understanding the invention. It does not necessarily describe the most generic embodiment of the invention or all species of the invention disclosed herein.

A small to medium sized company's perceived risk of incurring a given level of insurance loss can be more closely matched to an insurance carrier's needs to collect enough premium to cover all expected losses from all insureds and comply with state insurance regulations if the insurance carrier cedes a portion of the total risk to a reinsurance company and if the reinsurance company, in turn, provides a risk sharing participation program to the insured.

The risk sharing participation program is structured such that the insured's net premium payment will vary in a non-linear manner with respect to their actual losses. In particular, there will be accelerated savings in premiums for particularly low losses over a given period of time.

The risk sharing participation program is suitable for workers' compensation insurance as well as insurance coverage for other risks, such as general liability and health risks. Coverage may be provided separately or in combination.

BRIEF DESCRIPTION OF DRAWINGS

FIGS. 11A and 11B compare the combined Smith diagrams and Lee diagrams for medium sized and large sized companies.

FIGS. 13A and 13B compare Smith diagrams for non-linear premium plans with an adjustable maximum premium and minimum premium.

FIG. 15A illustrates how the loss conversion factor varies with actual losses for an exemplary embodiment of the invention.

FIGS. 15B and 15C illustrate a non-linear premium plan graphed on a Smith diagram and graphed relative to loss ratio.

DETAILED DESCRIPTION OF INVENTION

The following detailed description discloses various embodiments and features of the invention. These embodiments and features are meant to be exemplary and not limiting.

Loss Distributions and Linear Retrospective Premium Plans

Figure 1:
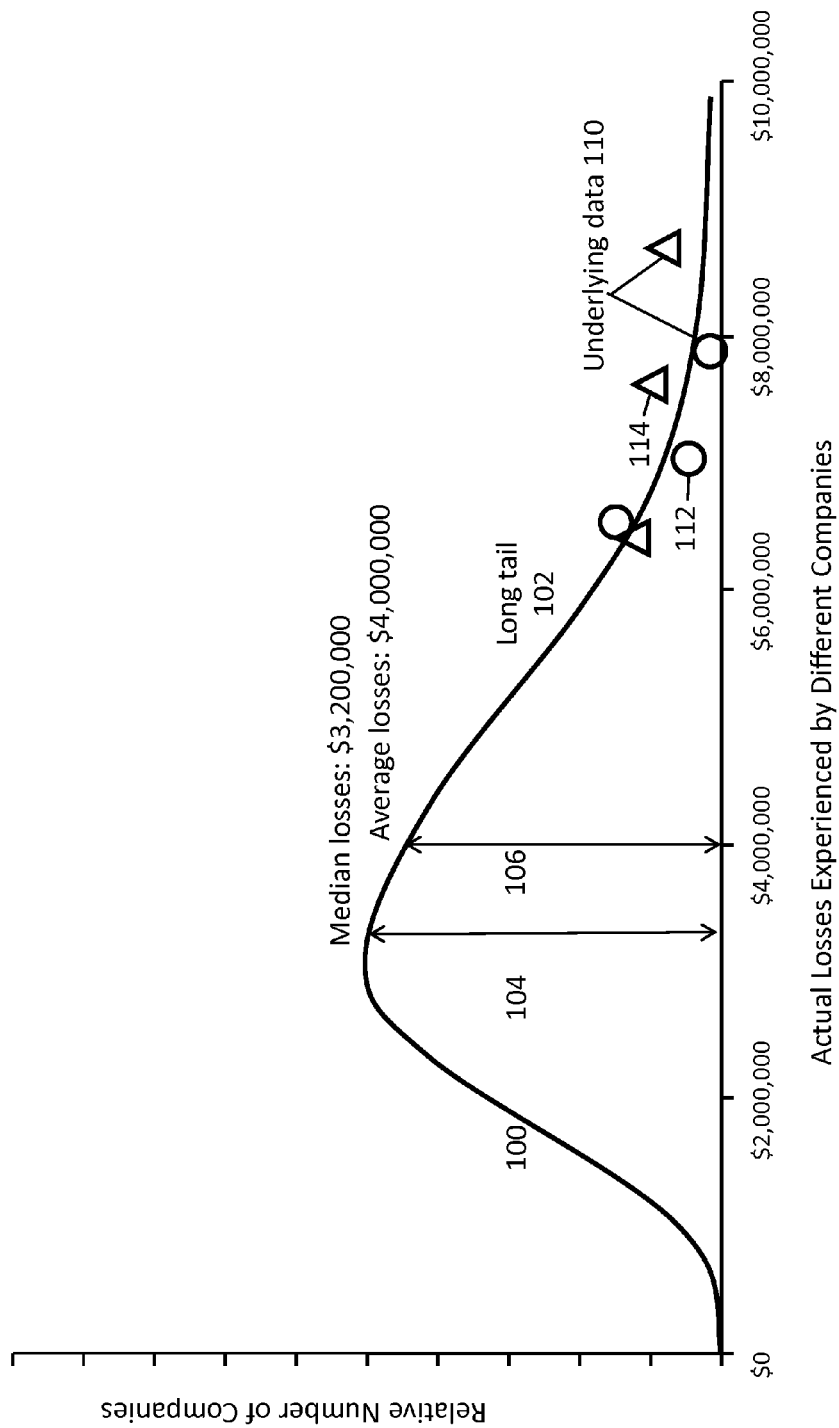
FIG. 1 is an illustration of a workers' compensation loss distribution for large companies.

FIG. 1 illustrates a distribution of actual workers' compensation insurance losses (loss distribution) experienced by large companies. Curve 100 shows the relative number of companies that experience a loss of a given size over a given period of time, such as one year. This is known as a frequency distribution of losses.

By "loss" it is meant the amount that a given insurance carrier pays to settle claims by injured workers employed by a single company covered by the insurance carrier in a given year. This graph takes into account the fact that an injured worker may make claims, such as for medical care reimbursement or lost wages, over a period of many years after an accident occurs.

The curve is based on data collected by various agencies, such as the National Council of Compensation Insurers. These agencies report out loss experience data in table form. "Table M" produced by the National Council of Compensation Insurers is an example of such a table. The current Table M as of the filing date is incorporated herein by reference.

Table M categorizes companies by their average expected worker's compensation losses. The categories are defined as "Expected Ultimate Loss Groups" or EULGs.

Each group covers a range of losses. As used herein, when a group of companies is described as having expected losses of a particular value, it is meant that their values fall in the range of the corresponding EULG. A company that has expected losses of $160,000, for example would fall in EULG 55. EULG 55 covers companies with expected losses in the range of $159,002.01 to $171,340.00.

Data points 110 illustrate underlying data which the frequency distribution is based on. Data points are only shown for the tail of the curve for clarity purposes. Full data sets would show points along the entire length of the curve. There is a certain amount of scatter in the data due to random fluctuations, as well as systematic differences between the types of workers represented. The circle data points 112 represent relatively low risk occupations, such as office workers. These data points tend not to extend out to the higher losses. The triangle data points 114 represent relatively high risk occupations, such as construction workers. These data points tend to extend out to the higher losses due in part to the higher probability of a worker suffering a long term disabling injury.

The frequency distribution curve illustrates that for companies seeking to purchase workers' compensation insurance, there can be a difference in perception between what the company feels its "expected losses" are and what the insurance company feels its "expected losses" are. This difference can lead to a difference in opinion as to what the appropriate insurance premium should be and can make the sales process difficult.

The curve presented in FIG. 1 is for companies that, on average, experience $4,000,000 in workers' compensation losses. These are large companies with several thousand employees. Insurance for these companies is often bought by a professional risk manager who is very familiar with the nature of their losses.

An important part of the nature of workers' compensation losses, is that the loss distribution has a long tail 102. This means that the losses experienced by most companies are fairly low, but on relatively rare occasions, a catastrophic event can lead to very large losses. These large losses increase the high-end tail of the distribution and pull the overall average 106 up above the median 104.

An insurance company considers the average losses to be the expected losses, since on average, this is what they expect to pay per insured. An insured company, however, may consider the median to be its expected losses, since that is what they normally expect to suffer. Hence there can be a mismatch in what the insurance company feels is a fair premium and what the company feels is a fair premium.

Figure 2:
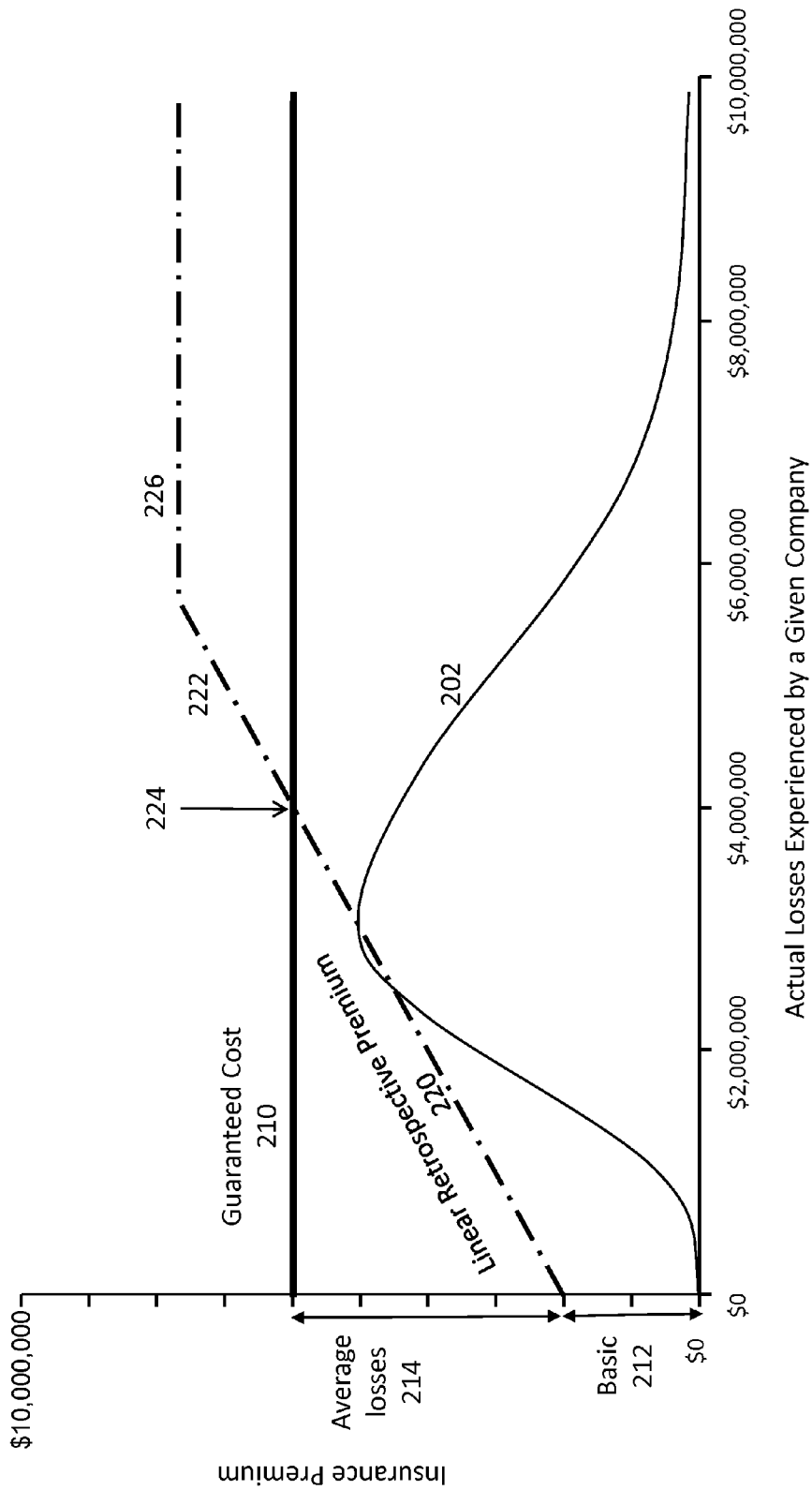
FIG. 2 is an illustration of a conventional linear retrospective premium plan for workers' compensation insurance for large companies.

This dichotomy has lead to the development of retrospective premium plans. FIG. 2 illustrates a comparison between a standard Guaranteed Cost insurance plan 210, and a participating linear retrospective premium insurance plan 220. Both of these types of plans are approved by the individual state insurance departments in the U.S. and therefore can be offered by admitted carriers to companies that meet certain criteria. The corresponding frequency distribution of loss 202 is also shown for reference purposes.

Guaranteed Cost plans are quite simple. The insured company pays a fixed premium no matter what its subsequent loss experience is for the term of its insurance coverage. This fixed premium is illustrated by the horizontal line 210.

The fixed premium can be thought of as equaling a Basic 212 plus the average losses 214. The Basic is the estimated cost of providing the insurance, not including claims. It includes sales, underwriting, profit and other fixed costs. The average losses is the expected average claims that will have to be paid. FIG. 2 illustrates that a company with expected average losses of $4 million per year might be charged a premium of $6 million per year. $4 million is to cover payment of the losses. $2 million is to cover the other costs of providing the insurance.

A participating linear retrospective premium insurance plan 220 varies the premium that a company will pay based on its actual losses during a coverage period. In the illustrated example, the minimum is set at the Basic. The insurance premium then increases linearly along region 222 with respect to actual losses until it reaches a maximum at plateau region 226. Thereafter, the premium is fixed. The maximum is set by the crossover point 224 and the shape of the underlying frequency distribution 202.

The standard equation describing the relationship between premium and actual losses over the linear region 222 is:

$$Premium = Basic + C * Actual\ Losses$$

where C is known as the Loss Conversion Factor.

An exemplary relationship between premiums and actual losses is illustrated in Table 1.

TABLE 1

Conventional Retrospective Premium Plan with Constant Loss Conversion Factor

| Actual Losses | Basic Expense | Variable Loss Expense | Taxes | Premium | C Loss Conversion Factor |
|---|---|---|---|---|---|
| $0 | $199,806 | $0 | $7,193 | $206,999 | |
| $256,868 | $199,806 | $64,217 | $18,752 | $539,643 | 1.295000 |
| $513,736 | $199,806 | $128,434 | $30,311 | $872,287 | 1.295000 |
| $770,603 | $199,806 | $192,651 | $41,870 | $1,204,930 | 1.295000 |
| $1,027,471 | $199,806 | $256,868 | $53,429 | $1,537,574 | 1.295000 |
| $1,284,339 | $199,806 | $321,085 | $64,988 | $1,870,218 | 1.295000 |
| $1,541,207 | $199,806 | $385,302 | $75,547 | $2,202,862 | 1.295000 |
| $1,798,075 | $199,806 | $449,519 | $88,106 | $2,535,506 | 1.295000 |
| $2,054,943 | $199,806 | $513,736 | $99,665 | $2,868,150 | 1.295000 |
| $2,311,811 | $199,806 | $577,953 | $111,225 | $3,200,795 | 1.295000 |
| $2,568,327 | $199,806 | $642,082 | $122,768 | $3,532,983 | 1.295000 |
| >$2,568,327 | $199,806 | | | $3,532,983 | NA |

The Loss Conversion Factor is constant, or at least constant to within the numerical accuracy of the system calculating the premiums. This, in part, is due to the fact that there has been no motivation to modify a Loss Conversion Factor and it is therefore easiest to keep it the same over the linear portion of the retrospective rating plan.

For losses higher than $2,568,327 (last row of table 1), the premium is capped at the maximum, $3,532,983. The loss conversion factor is not applicable in this range (NA).

Only large companies, such as those with expected losses of at least $500,000 per year, can qualify for retrospective plans in the US. Small and medium sized companies are usually limited to Guaranteed Cost insurance. Also, the only retrospective plans that are available are linear ones. This is due in part to governmental and other regulatory requirements as well as the computational difficulties inherent in providing premium quotes for a broad range of companies that vary in a non-linear manner. The computational and practical challenges of providing non-linear plans and the reasons why they have not been available prior to the disclosures provided herein, are described in more detail in Crouse, Charles, "On Non-Linear Retrospective Rating", Proceedings of the Casualty Actuarial Society, Nov. 18, 1949. Said publication is incorporated herein by reference.

Non-Linear Retrospective Premium Plans for Medium Sized Companies

Figure 3:
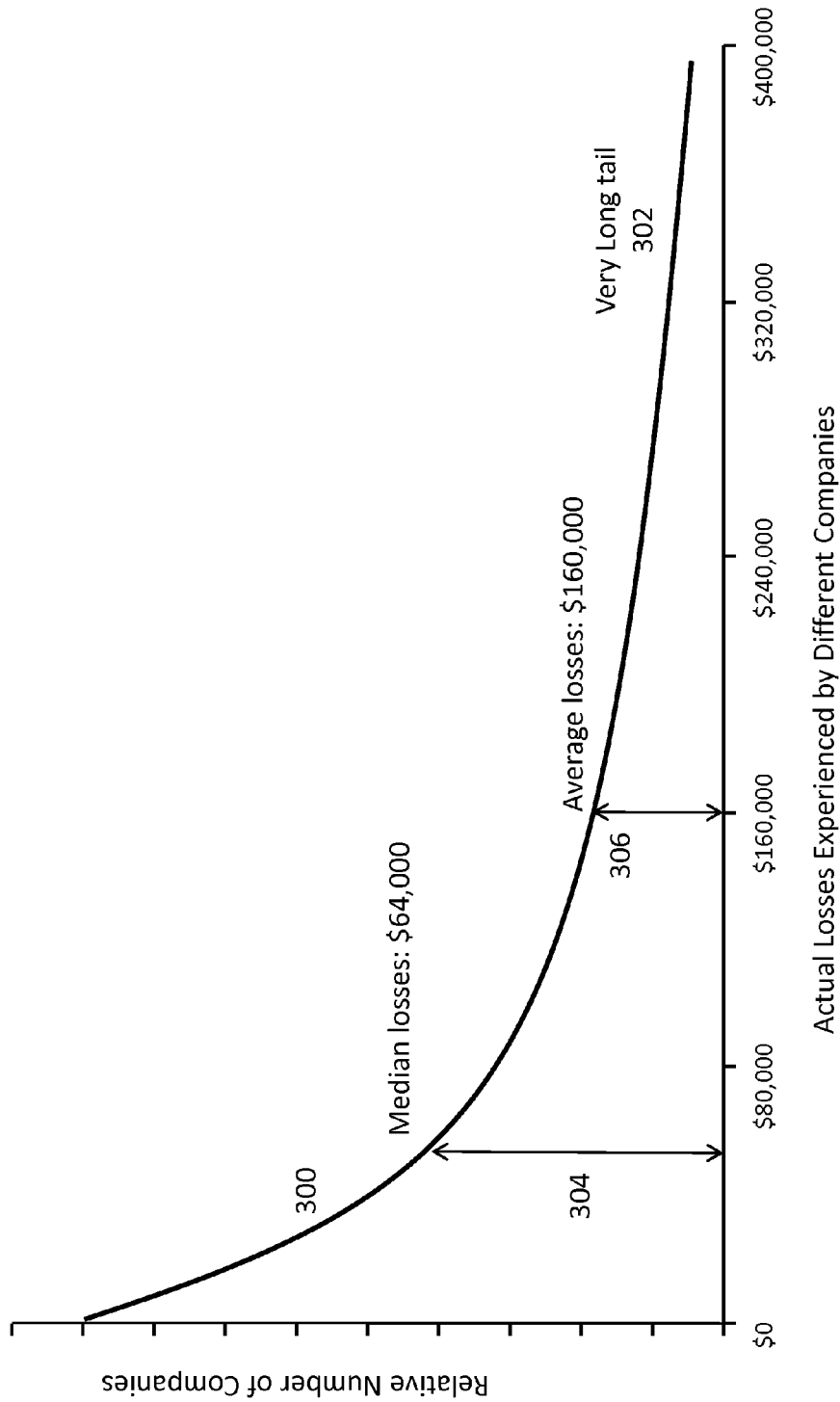
FIG. 3 is an illustration of a workers' compensation loss distribution for medium sized companies.

FIG. 3 illustrates the frequency distribution 300 of actual losses for medium sized companies. It is dramatically different than the frequency distribution of actual losses for large companies shown in FIG. 1. The frequency distribution presented is for companies that have average losses of $160,000 per year. These companies might have several hundred employees.

The peak of the frequency distribution has shifted to zero. This means that it is fairly likely that some companies will experience no losses at all in a given year. In this case, the probability that a company will experience no loss is about 10%. On the other hand, the tail 302 has become much longer. This means that companies that do experience losses are much more likely to experience losses that are much higher than the average. The net effect is that average losses 306 are much higher than median losses 304. The size of the difference between average losses 306 and median losses 304 dramatically reduces the viability of linear retrospective plans for these companies and hence tonly Guaranteed Cost plans are available to them.

Figure 4:
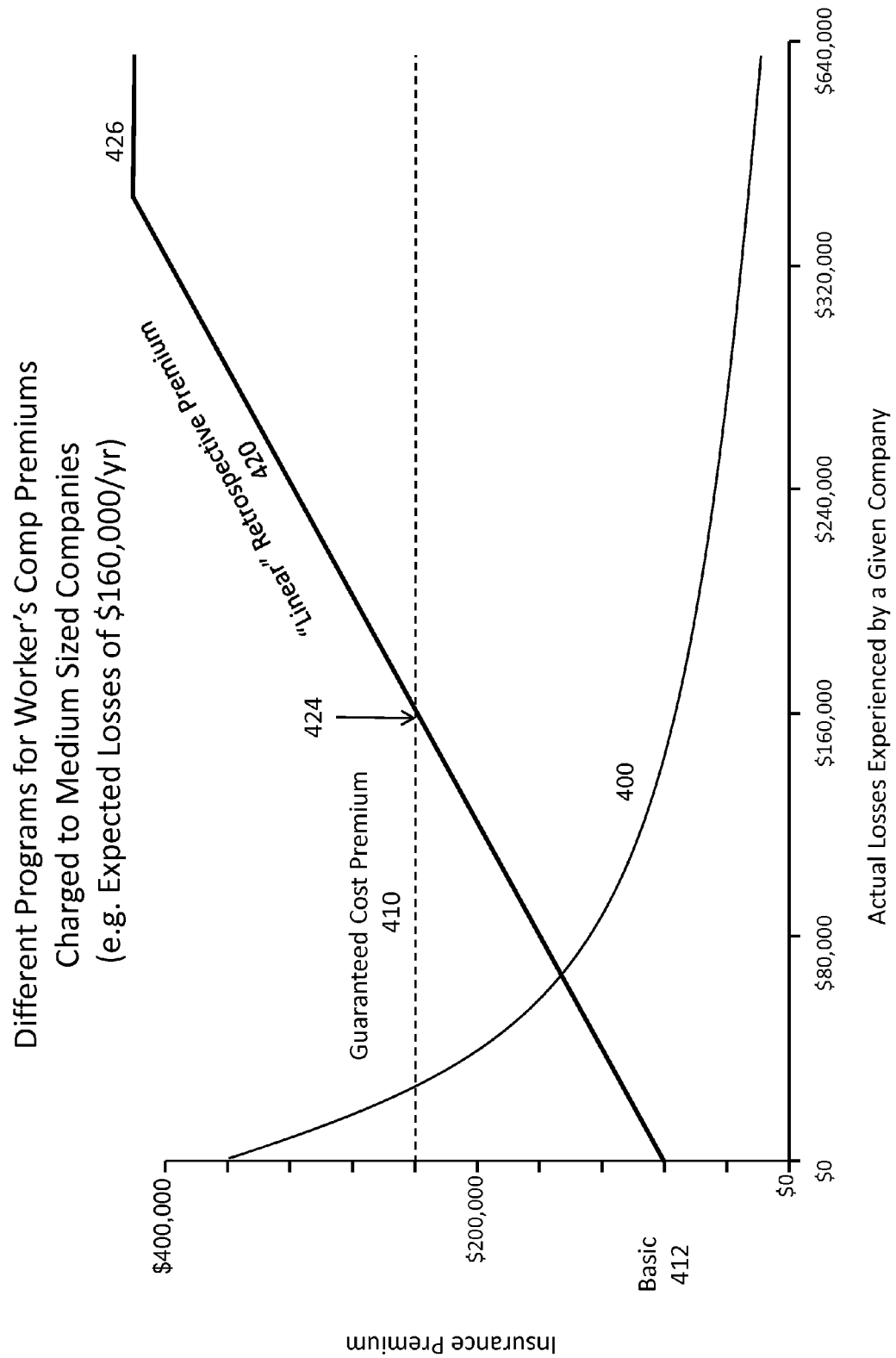
FIG. 4 illustrates the difficulties inherent in offering conventional linear retrospective premium plans to medium sized companies.

FIG. 4 further illustrates why a linear plan 420 is not viable for medium and small sized companies. The corresponding Guaranteed Cost plan 410 and frequency distribution of losses 400 are shown for comparison. If the minimum is set to the Basic 412, and the crossover 424 with the Guaranteed Cost plan 410 is pegged at the average losses, then the linear portion of the curve must extend to a relatively much higher level 426 than a large company in order for there to be enough premium collected to cover the overall cost of claims. The very high maximum means that the policy is no longer effectively insurance for companies that suffer large losses. This is because the cost of the premiums and the amount of the losses themselves are of the same magnitude. Also, there is little or no risk-sharing between the companies that suffer large losses with those companies that do not suffer any losses.

Figure 5:
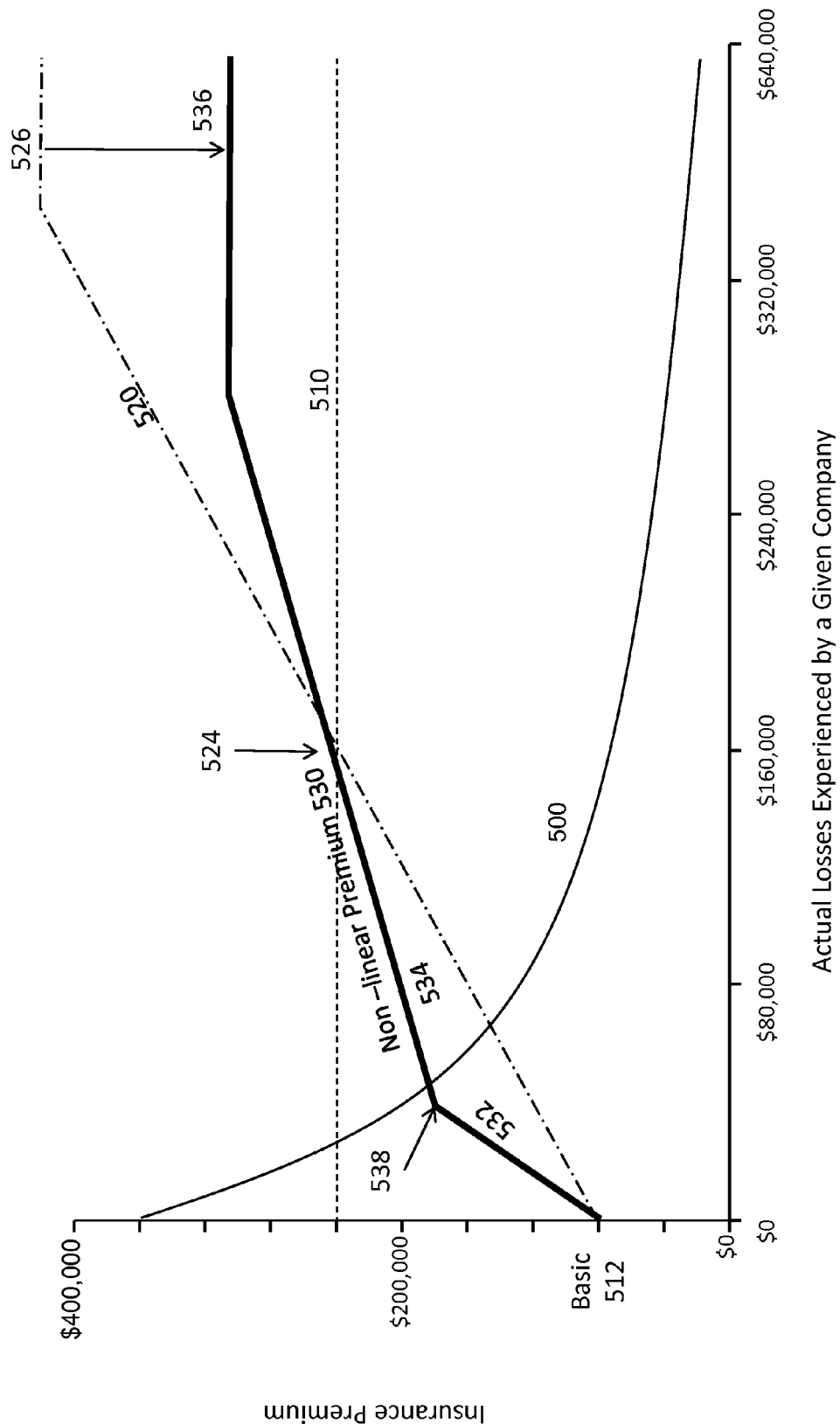
FIG. 5 illustrates the ability of an exemplary non-linear participation plan to overcome the limitations of a linear plan.

FIG. 5 illustrates a class of non-linear premium functions which address many of the above limitations and allow participating insurance plans to be effectively offered to medium and even small companies.

The non-linear premium function 530 illustrated in FIG. 5 comprises an initial relatively steep portion 532, a breakpoint 538, a subsequent relatively shallow portion 534, and a plateau portion 536. A corresponding linear plan 520, Guaranteed Cost plan 510 and frequency distribution of losses 500, are shown for comparison.

The non-linear plan is set at the Basic 512 for zero actual losses. It is pegged 524 at the level of the Guaranteed Cost plan at the average. Because there is a breakpoint 538 in the function, the plateau portion 536 of the non-linear plan 530 can be much lower than the plateau 526 of the corresponding linear plan 520. The reason is that more premium is collected at lower loss levels where most insured companies will wind up. This extra premium is available to compensate for the higher losses that the smaller fraction of insured companies will experience.

From a customer standpoint, this non-linear plan has an advantage over a linear plan of still providing meaningful savings in premiums for companies with losses somewhat below the average, the possibility of very large savings in premiums for companies with exceptionally low losses, and a much lower cap on maximum premiums for companies with large losses.

From an insurance carrier standpoint the non-linear approach provides an additional parameter (e.g. the breakpoint 538) which can be adjusted during the sales process to better meet the perceived needs of the customer.

Curvilinear Premium Function

Figure 6:
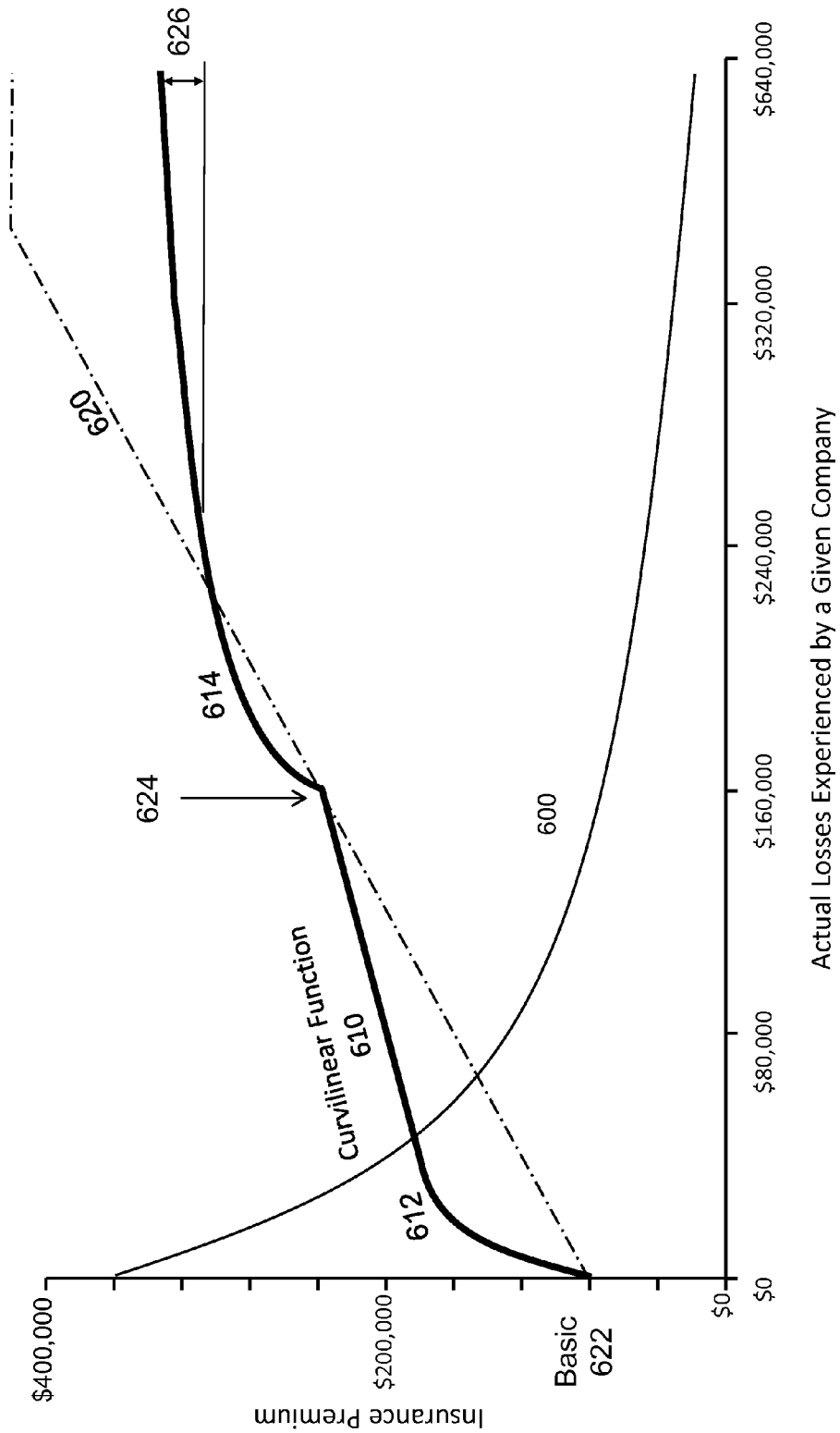
FIG. 6 illustrates an exemplary curvilinear participation plan.

FIG. 6 illustrates a non-linear premium function 610 with curvilinear properties. A corresponding linear plan 620 and frequency distribution of losses 600 are shown for comparison.

The curvilinear function 610 comprises an initial feathered portion 612, a dimple 624, and a subsequent feathered portion 614. A plateau (not shown) may also be present at very high actual loss levels.

Similar to the corresponding linear plan 620, the curvilinear function intersects the Y axis at the Basic 622 and has a premium equal to the corresponding guaranteed premium at the average of the actual losses 624. From a company perspective, the curvilinear approach presents a smoother looking curve which shows increasing benefit for exemplary safety performance (lower actual losses).

From an insurance carrier perspective, the accelerated increase in premium shown in feathered portion 614 after the dimple 624 provides more premium dollars to help keep the upper plateau as low as possible. The curvilinear approach also allows small incremental increases 626 in premiums even if actual losses almost triple so that there is always some premium savings incentive for continued safety vigilance even in years when large losses have already occurred.

Reinsurance Participation Plan

One of the challenges of introducing a fundamentally new premium structure into the marketplace is that the structure must be approved by the respective insurance departments regulating the sale of insurance in the states in which the insureds operate.

In the United States, each state has its own insurance department and each insurance department must give its approval to sell insurance with a given premium plan in its respective jurisdiction. Getting approval can be extremely time consuming and expensive, particularly with novel approaches that a department hasn't had experience with before. Also, many states require insurance companies to only offer small sized and medium sized companies a Guaranteed Cost plan, without the option of a retrospective plan. In part, this is because of governmental rules and laws that regulate the insurance industry.

Disclosed herein is a reinsurance based approach to providing non-linear retrospective premium plans to insureds that may not have the option of such a plan directly. It also has the surprising ability to enable non-linear plans while at the same time complying with state regulations.

Figure 7:
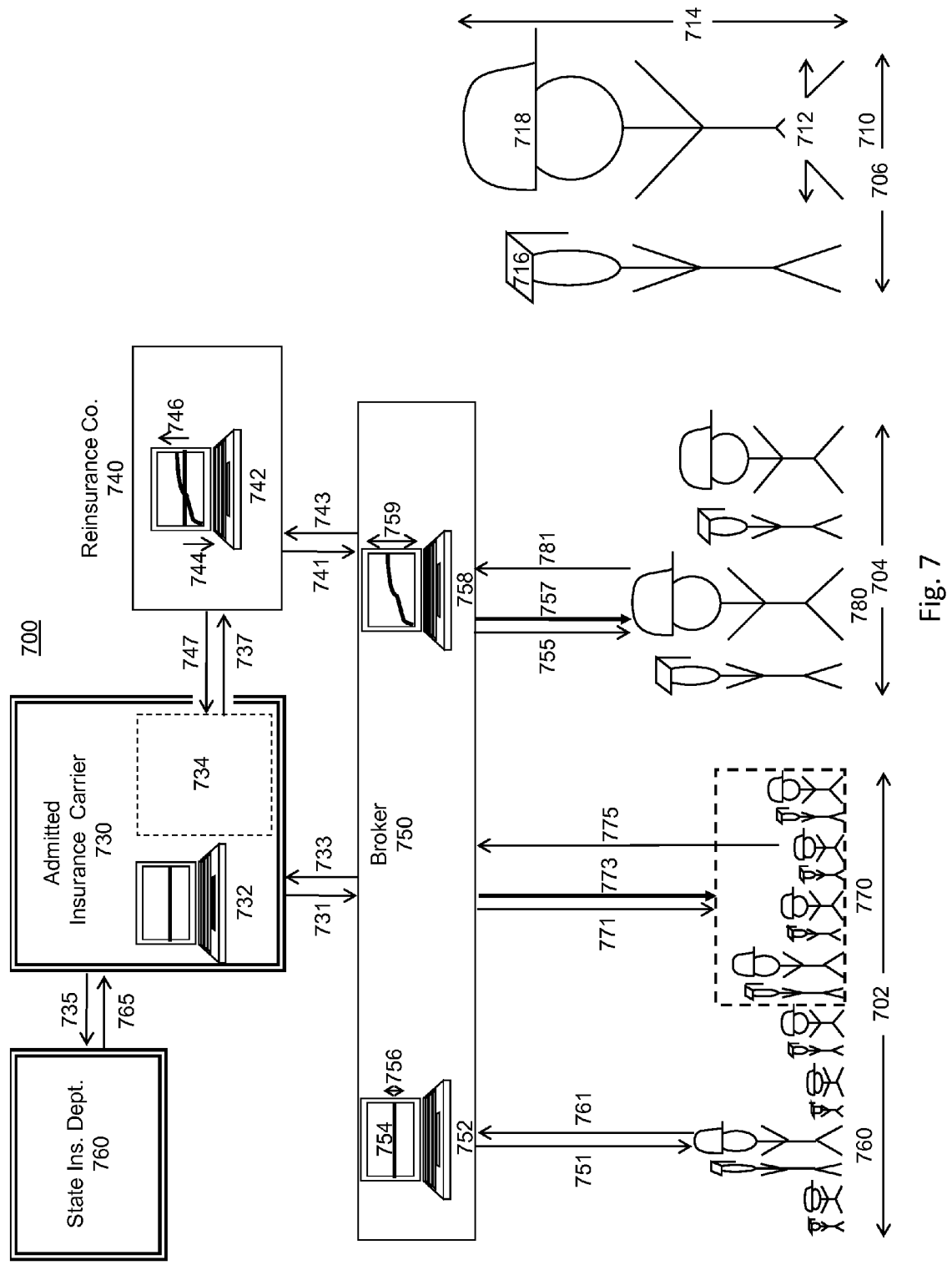
FIG. 7 illustrates an exemplary system for providing a reinsurance participation plan that is in compliance with insurance regulations.

FIG. 7 illustrates an exemplary physical system and method tied to particular machines which allows for the provision of improved insurance premium plans in compliance with regulatory requirements that do not make specific provision for these plans. It is based on the fact that an insurance carrier can cede a certain portion of an insurance risk to a reinsurance company. Said reinsurance company can, in turn, enter into a separate Participation Agreement with the insured whereby a credit or debit is assessed on the insured as a function of the losses experienced by each insured.

An admitted insurance carrier 730 has a license from a state insurance department 760 to sell Guaranteed Cost workers' compensation insurance in a given state. The insurance carrier obtains approval by using an industry standard Guaranteed Cost policy and filing premium rate requests with the insurance department 735. The insurance department, already familiar with the policy, approves the rates 765.

The insurance carrier then contractually arranges with a broker 750 to sell said standard policies to a targeted class of companies. These targeted classes include small sized 702 and medium sized 704 companies. As used herein, a small company has average losses of $60,000 per year or less. A medium sized company has average losses in the range of $60,000 to $500,000 per year. A large company has average losses of $500,000 per year or more. In this instance, the insurance carrier elects not to offer the policies to large companies 706 for competitive reasons.

As used herein "broker" is used in a broad sense to include independent brokers, independent agents, captive agents, the insurance carrier's own sales force, and other entities licensed to sell insurance.

Insured companies are shown in FIG. 7 as stick figures 710. The width 712 of a stick figure corresponds to the average loss rates for a given company. The height 714 of a stick figure corresponds to the actual losses experienced in a given year. The hat on a stick figure corresponds to the aggregate riskiness of the jobs in the company. A hard hat 718 (e.g. construction) corresponds to relatively high risk jobs. A mortar board 716 (e.g. office) corresponds to relatively low risk jobs.

In order to assist the broker in selling the insurance product, the insurance carrier 730 develops a computer implemented sales tool 732. This is transferred 731 to the broker 750. The broker makes additional modifications 752 to adapt it to its own needs (e.g. installed broker logos). The broker then uses the tool to illustrate 751 policies to prospective insureds 760. Whereas the policies are Guaranteed Cost policies 754, the broker nonetheless has a certain amount of freedom 756 to adjust the premiums to meet market demands.

If an insurance offering meets a prospective insured's needs, then it may apply 761 for coverage. A portion of the application information may then be transferred 733 to the insurance carrier 730 for underwriting purposes. If approved, the prospective insured then pays a premium and coverage is bound for the next year.

In order to provide a certain amount of loss participation to a prospective insured, the insurance carrier 730 may cede 737 a portion 734 of the insured risk to a reinsurance company 740 and pay a corresponding premium to said reinsurance company. The reinsurance company may be a captive reinsurer. In an exemplary embodiment, the insurance carrier 730 may retain the initial 40% of the risk, cede the next 20% of the risk to the reinsurance company 740 and retain the final 40%. If the insurance carrier 730 as a whole experiences total losses greater than 40% of the expected losses, then the reinsurance company 740 will pay 747 up to the next 20%.

The reinsurance company 740 can now provide funds to implement a non-linear retrospective rating plan as a "participation plan". The reinsurance company does this by entering into a separate contractual arrangement directly with the insured. If the insured has lower than average losses in the next year, then the reinsurance company can provide a premium reduction 744 according to the participation plan. If the insured has higher than average losses in a given year, then the reinsurance company will assess additional premium 746 accordingly. The insured can now, in effect, have a retrospective rating plan because of the arrangement among the insurance carrier 730, the reinsurance company 740 and the insured even though, in fact, the insured has Guaranteed Cost insurance coverage with the insurance carrier 730.

The technology 742 to illustrate the participation plan can be transferred 741 to the broker 750 so that the broker will have the technology 758 to illustrate the plan to a prospective insured. One of the advantages of the participation plans described herein is that the broker 750 has greater freedom 759 to adjust the plan to meet the requirements of a prospective insured than it would have with either a Guaranteed Cost plan or a conventional linear retrospective plan.

Companies eligible for the participation plan might be medium sized companies. The broker would target these companies and would present the combined insurance 755 and participation plans 757 to a given prospective insured 780. If the prospective insured applied 781 for both offerings, then the necessary information 733, 743 would be transferred to the insurance carrier 730 and the reinsurance company 740 such that each could enter into its respective agreements.

The non-linear plans described herein, such as a curvilinear plan, may even be offered 771, 773 to small companies if the loss experience of a multiplicity of small companies is aggregated into a cell 770. The companies within a given aggregation cell may not be aware of who the other companies are. Each one must make separate application 775 for coverage. Enough small companies should be present in a cell so that the collective expected losses are comparable to a medium sized company.

Aggregation may also be over time. A relatively small company, for example, may be able to qualify by itself for a non-linear plan if it is willing to make a firm commitment for three year participation so that it's average losses over three years are comparable to the average annual losses of a medium sized company. The insurance policies themselves are one year policies, but the separate participation plan agreement is for a three year term.

It may be helpful in time-aggregation if prospective insureds are redundantly notified over the course of the sales process and thereafter with very explicit language that the participation agreement is for several years and not just one. To accomplish this, for, example, multiple signatures by responsible parties in the prospective insureds for said redundant notifications may be required. This reduces the exposure of the insurance carrier, broker and reinsurance company to complaints by the insured company once the participation agreement is in force due to the fact that the insured company "didn't realize" that the agreement was for a term of multiple years. Similar considerations are useful for aggregations over multiple companies.

Smith Premium Ratio Diagrams

Another barrier to providing non-linear retrospective plans has been the inordinate complexity of calculating the appropriate premiums for companies of various sizes and presenting said premiums to prospective insureds. It has been surprisingly discovered, however, that a new method of graphically representing these plans largely overcomes these difficulties. This new form of graphical representation is termed a "Smith Premium Ratio diagram" or simply a Smith diagram. Smith diagrams are used in combination with Lee Loss Ratio diagrams (or simply "Lee diagrams") to substantially simplify the calculation of the appropriate relationship between actual losses and premium for non-linear retrospective plans.

Figure 8:
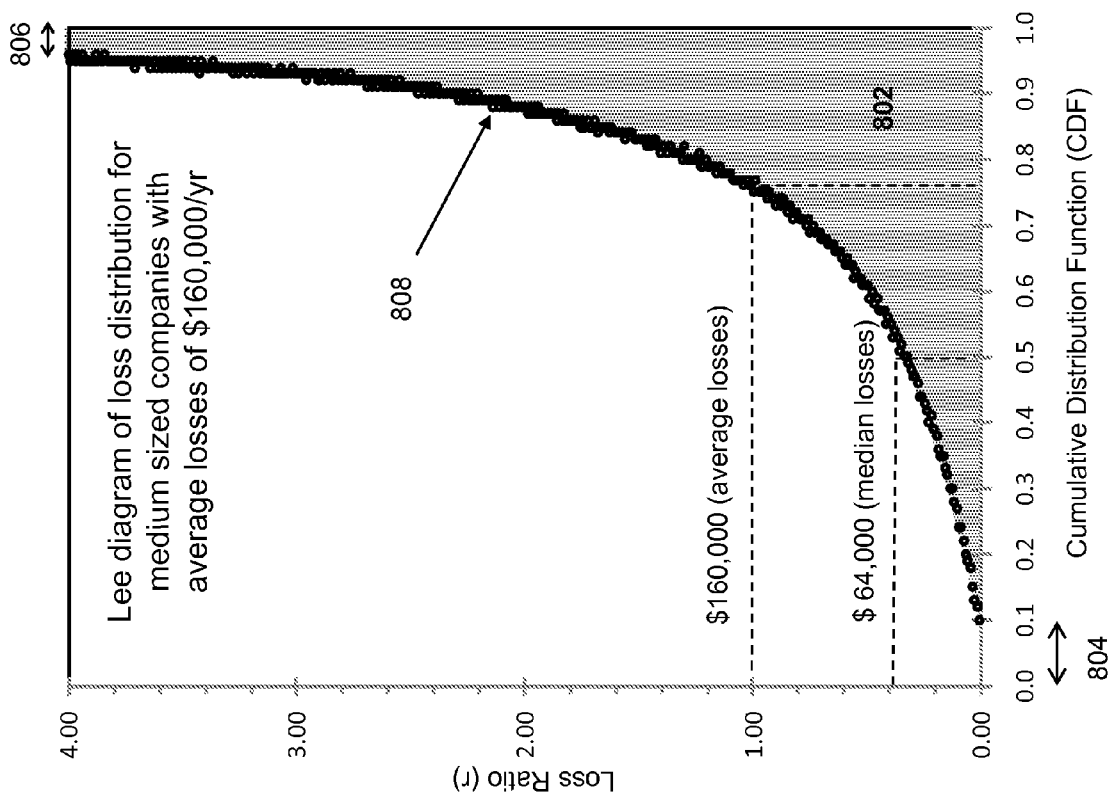
FIG. 8 is a Lee diagram which illustrates the relationship between loss ratio and cumulative distribution function for medium sized companies.

FIG. 8 is a Lee Loss Ratio diagram which illustrates the relationship between loss ratio (r) and cumulative distribution function of actual losses (CDF) for medium sized companies. Lee diagrams are more fully described in Lee, Yoong-Sin, "*The Mathematics of Excess Loss Coverages and Retrospective Rating—A Graphical Approach*", Section 4, PCAS LXX, 1983. Said publication is incorporated herein by reference.

A loss ratio is the ratio of actual losses to expected average losses. If a company has expected average losses of $160,000 per year, and experiences an actual loss of $80,000 in a given year, it will have a loss ratio r of 0.5 for said given year.

The cumulative distribution function of actual losses (CDF) of a company is the rank of that company's actual losses in a given year relative to the actual losses of all of the other companies with the same expected average losses. If a company has a CDF of 0.5, then half of the other companies with the same expected losses had actual losses greater then said company had.

Curve 808 in FIG. 8 shows the loss ratio versus CDF for companies with expected average losses of $160,000. This curve is calculated from the above referenced Table M. The scatter in the curve is due in part to rounding errors in the data presented in Table M.

The loss ratio curve intersects the x axis 804 at a CDF of 0.1. This means that 10% of the companies in this class will have zero losses in a given year.

The loss ratio has a value of 4 at a CDF of 0.95. This means that 5% of the companies 806 in this class will have losses that are at least four times the average in a given year.

The area under the curve 802 represents the total losses for all companies in this class. Since the y axis has been normalized by dividing the actual losses by the expected average losses, the area under the curve is unity. This is true for all classes of company size. The area under the curve includes the area not shown for values of loss ratio above 4.

Figure 9:
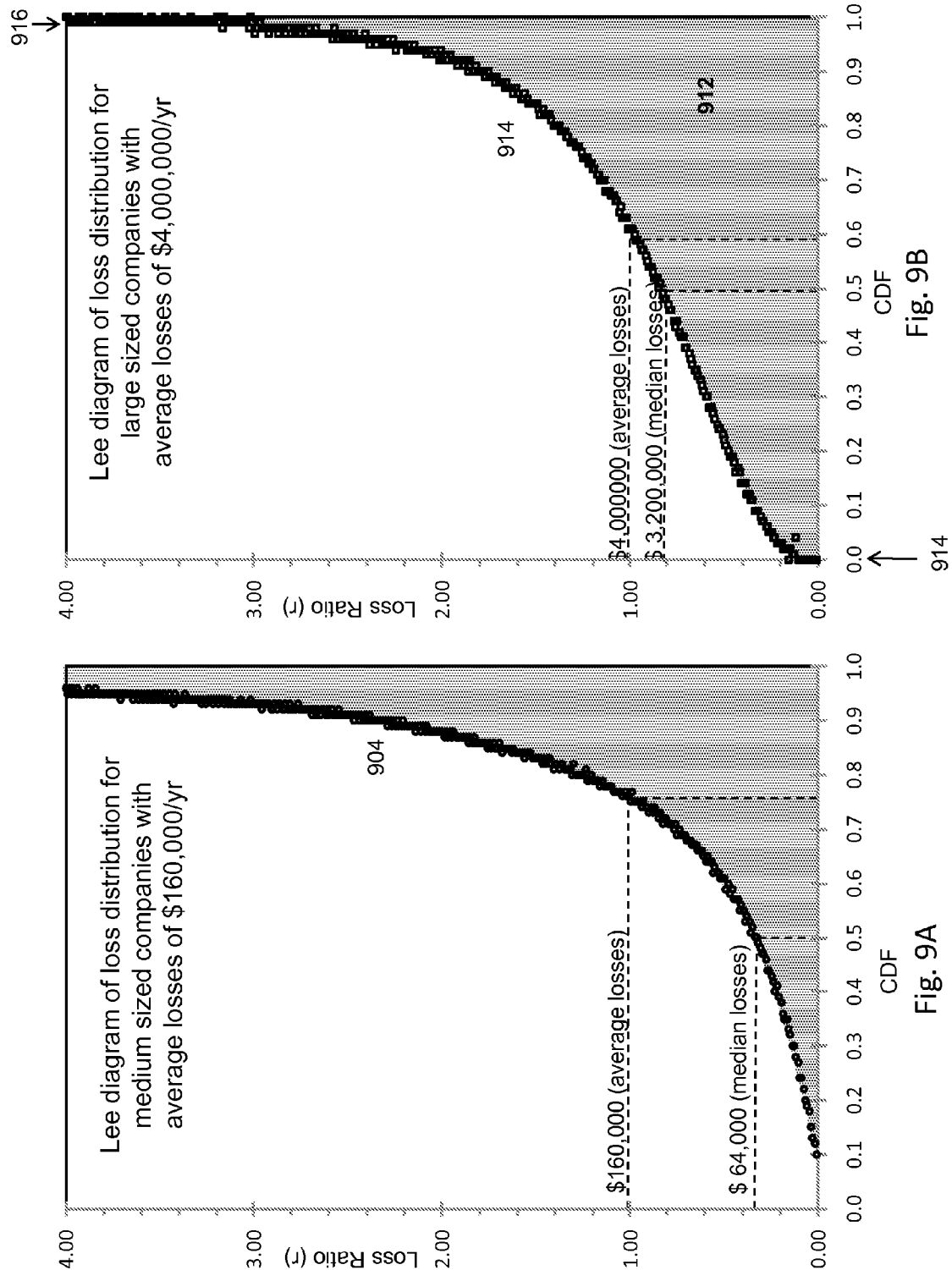
FIGS. 9A and 9B compare the Lee diagrams for the loss distributions of medium sized companies and large sized companies.

FIGS. 9A and 9B compare the Lee diagram for medium sized companies and the Lee diagram for large companies. Relative to the loss ratio curve for medium sized companies 904, the loss ratio curve for large companies 914 is shorter and fatter. The probability that a large company has no losses 914 is very small. Likewise the probability that a large company has losses greater than 4 times the expected average loss 916 is also very small. The area under the curve for large companies 922, however, is still unity.

Figure 10:
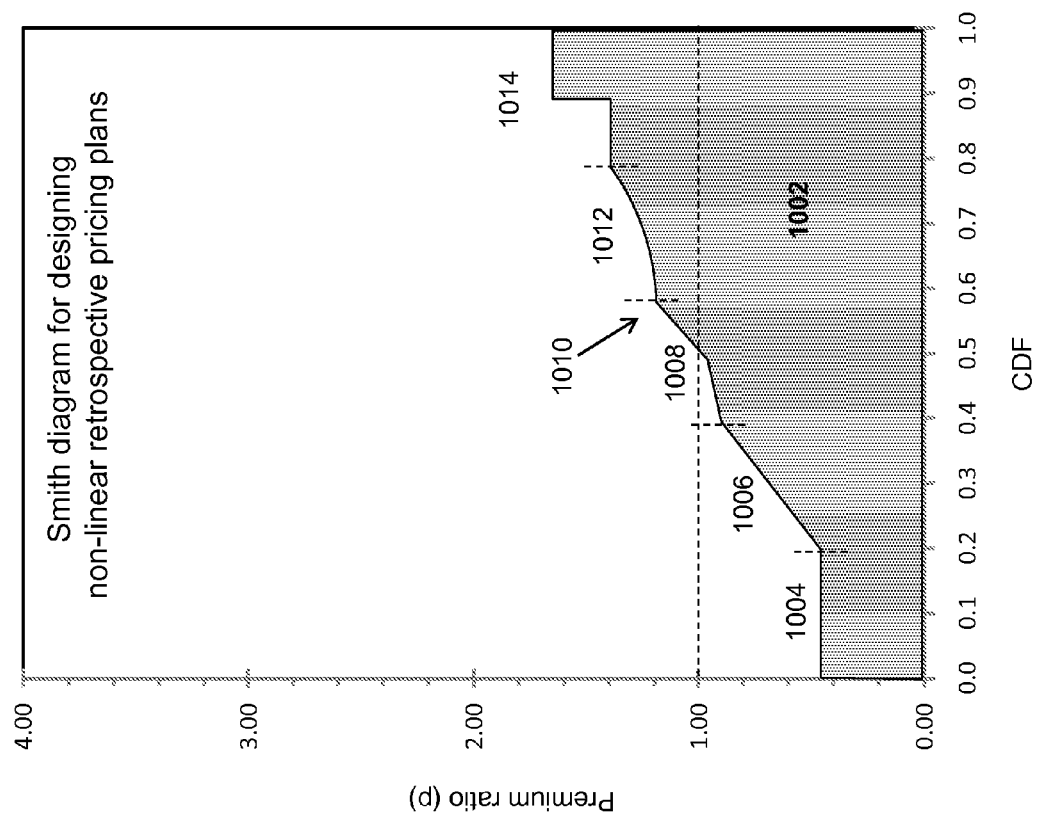
FIG. 10 is a Smith diagram which illustrates the relationship between premium ratio and cumulative distribution function for a non-linear retrospective premium plan.

FIG. 10 illustrates an exemplary Smith diagram for designing a non-linear retrospective premium plans. The Smith diagram is similar to the Lee diagram in the sense that the x axis is the CDF of the actual losses experienced by the companies in a given size class. The y axis, however, is a designed Premium ratio (p) instead of an experienced Loss ratio (r). A Premium ratio is defined as the ratio of the actual premium charged to a given company divided by the Guaranteed Cost premium. A curve on a Smith diagram is a Premium ratio curve. It indicates what premium an insured company will be charged as a function of the CDF of their actual losses, as opposed to the actual losses themselves. The area 1002 under the premium ratio curve 1010 will be equal to unity for plans which are designed to collect the same amount of premium as if all insureds paid the Guaranteed Cost premium. Premium curves with higher and lower areas may be used depending upon the market requirements.

A designer of a non-linear retrospective premium plan has tremendous freedom using a Smith diagram. In general, plans designed on a Smith diagram will be non-linear when premiums are graphed versus losses, due to the non-linear nature of the loss curves. This will be discussed in more detail below.

FIG. 10 illustrates an exemplary non-linear premium plan 1010 with a variety of design features. The plan may have horizontal portions 1004 when insureds in a certain range of losses should be paying the same premium. This would include insureds in relatively small size classes that are expected to have zero losses at low CDFs.

The plan may have regions that increase linearly with CDF 1006 where it is desired that premiums increase linearly with increasing losses. As indicated above, premiums may increase linearly with CDF, but they will not increase linearly with actual losses due to the non-linear relationship between loss ratios and CDF.

The plan may have dimple sections 1008 where the slope of the premium increases. There can also be curved portions 1012 and step changes 1014.

The premium curve should generally increase or at least stay the same as CDF increases.

The premium curve should also be single valued at a given CDF so that only one premium will be charged for a given CDF.

FIG. 11A shows how a Smith Premium Ratio diagram can be overlaid with a Lee Loss Ratio diagram so that the relationship between the loss ratio (r) and premium ratio (p) can be calculated. This, in turn, can be used to calculate the relationship between actual premium and actual losses. The premium ratio curve is shown as item 1100. The loss ratio curve is shown as item 1108. The CDF scales are matched and the loss ratio and premium ratio scales are also matched.

For a given loss ratio 1102, the corresponding CDF 1104 is read off of the loss ratio curve 1108. The premium ratio 1106 is then read off of the premium ratio curve at the same CDF. In this example, a loss ratio of 1.00 corresponds to a CDF of 0.75. A CDF of 0.75, in turn corresponds to a premium ratio of 1.35. The loss ratio curve 1108 is for medium sized companies with average losses of $160,000 per year. An approved Guaranteed Cost premium for said companies might be $208,000. A company participating in this plan that has a loss ratio of 1.00, therefore, will pay a premium of $280,800 (p=1.35).

FIG. 11b shows that the same premium ratio curve 1110 can be used for substantially larger companies, such as those with average losses of $4,000,000 per year. The premium ratio for a given loss ratio is calculated in the same manner, but using the loss ratio curve for large companies 1118 of this size. At 1112 in FIG. 11b, loss ratio of 1.00, for example, corresponds 1116 to a premium ratio of 1.2 and not the premium ratio of 1.35 as for smaller companies.

The steps for determining the relationship between premium and loss for non-linear plans can be automated using appropriate look up tables for loss ratio and premium ratio curves. Analytic forms can also be used. The method has the surprising ability to provide accurate and reproducible premiums despite scatter in the underlying data of the loss ratio curves.

FIGS. 12A through 14B present the Smith diagrams for a range of premium plans.

Figure 12A:
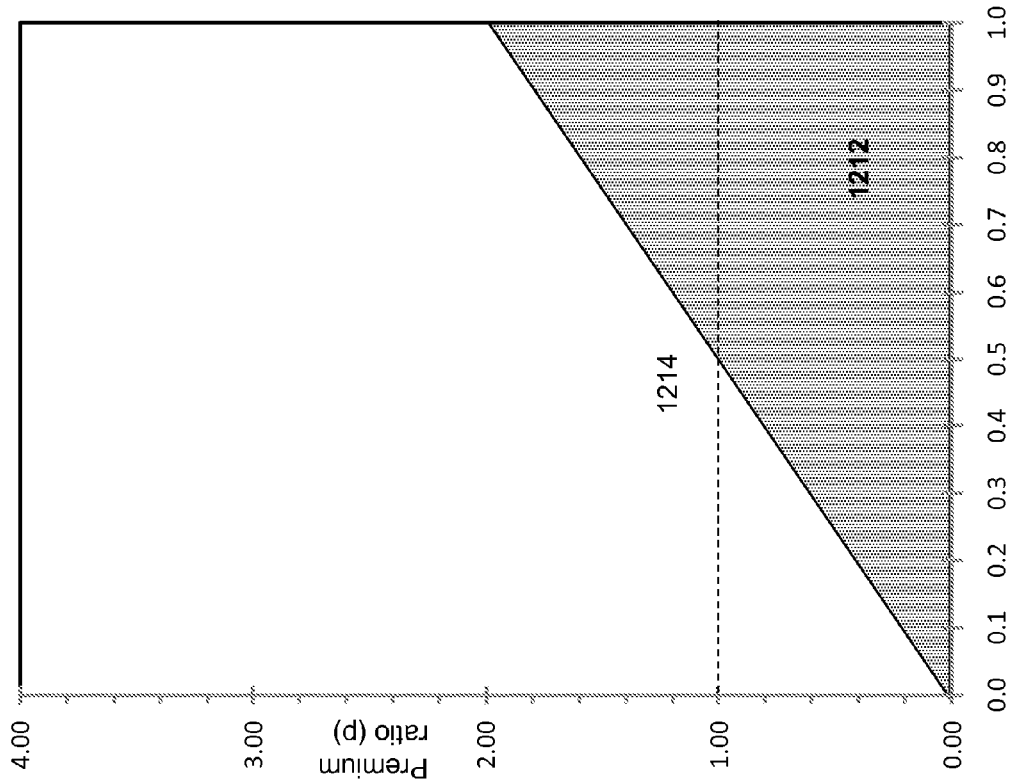
FIGS. 12A and 12B compare the Smith diagrams for a fixed premium plan and a non-linear premium plan.

FIG. 12A presents the Smith diagram from a simple Guaranteed Cost plan where the premium that the insured pays is the same no matter what its actual losses (CDF) are.

The premium curve 1204 is a horizontal straight line. The area 1202 under the curve is one (i.e. 1.00×1.0).

Figure 12B:
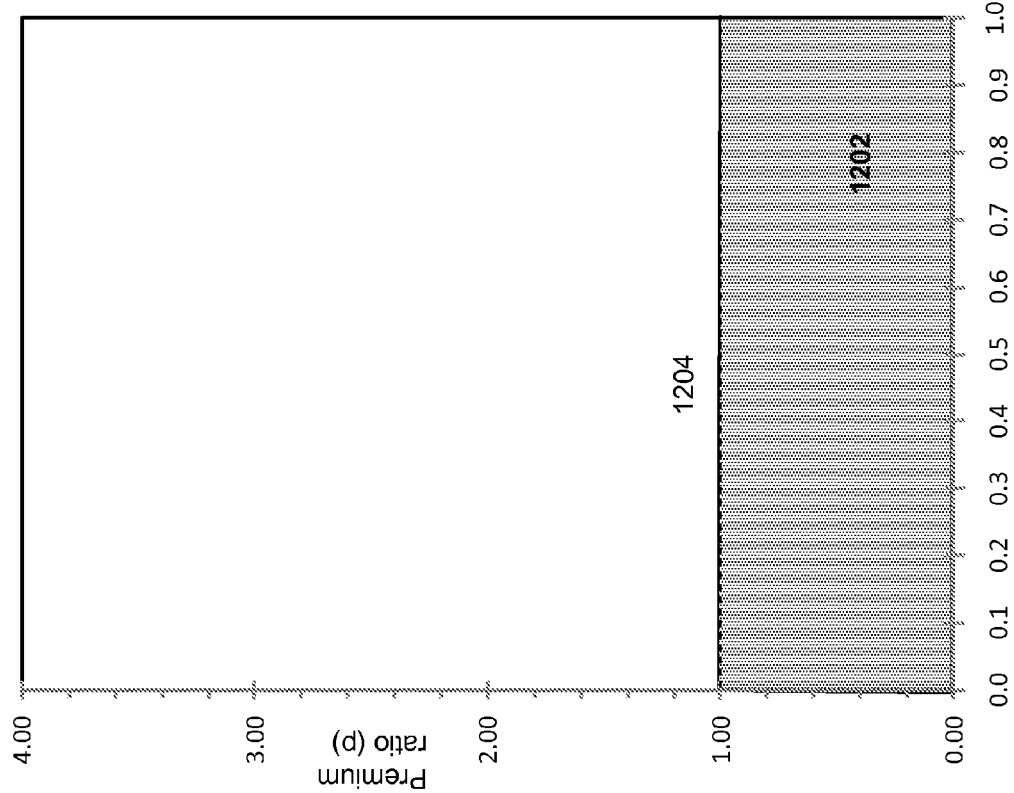

FIG. 12B presents a Smith diagram for a straight line plan 1214. It is suitable for large companies where the probability of having zero losses is low. It has a premium that is linear with respect to CDF, but is non-linear with respect to actual losses. As discussed above, this is due to the curvature in the loss ratio curve of the corresponding Lee diagram.

The area 1212 under the premium ratio curve is one (i.e. ½×2.00×1.0). This plan charges no premium to an insured if their losses are zero (CDF=0.0). The maximum premium is capped at twice the Guaranteed Cost premium (p=2.00). All insureds, however, have an opportunity to get a discount relative to the maximum premium, no matter how high their losses are. Even if an insured has losses that are in the top 90% (CDF>0.9), it can still have a discount of 10% relative to the maximum.

FIG. 13A presents a Smith diagram for a straight line plan 1304 with a horizontal premium cap 1306. The horizontal premium cap allows the insured to significantly lower the maximum premium 1308 should they experience high losses in exchange for a somewhat higher premium 1302 when they experience lower losses.

FIG. 13B presents a Smith diagram for a straight line plan 1314 that has a positive y intercept 1316. The intercept corresponds to the Basic. This allows insureds to tradeoff a reduction in maximum premium 1318 in exchange for an increase 1312 in minimum premium while at the same time being able to earn a discount relative to the maximum no matter how high their losses are.

Figure 14A:
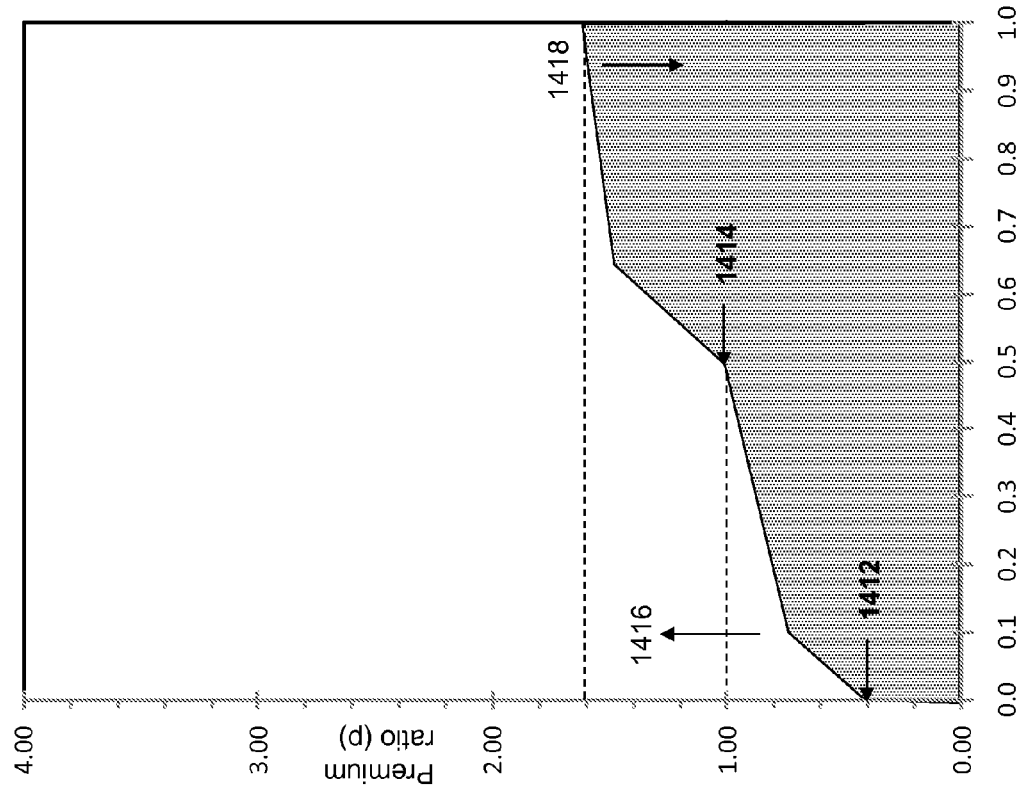
FIGS. 14A and 14B compare Smith diagrams for non-linear premium plans that allow independent adjustment of maximum premium, Basic, Guaranteed Cost premium and minimum premium.

FIG. 14A presents a Smith diagram for a straight line plan 1406 that has a horizontal portion 1402 of constant premium ratio at low CDFs. Plans with this feature are suitable for medium sized and even small sized companies where a significant fraction of insureds will not have any losses. In the case illustrated, the plan is suitable for companies that have up to a 20% chance of being loss free in a given year. This design also incorporates a horizontal cap 1408 on the maximum premium.

Figure 14B:
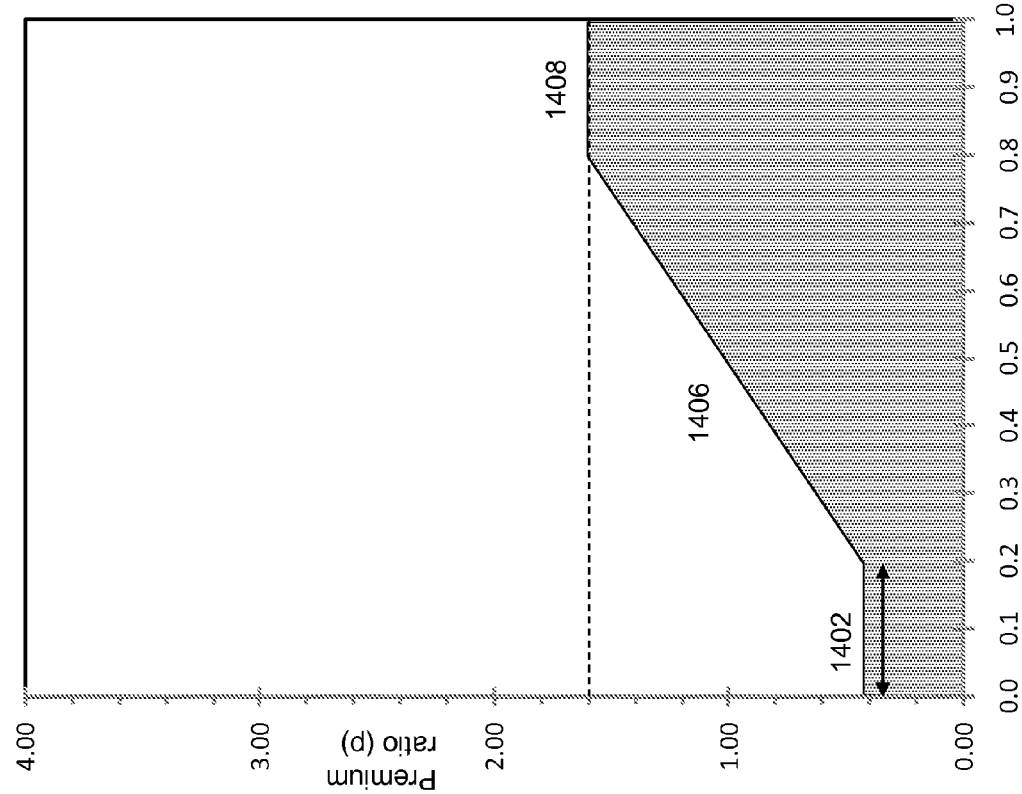

FIG. 14B presents a Smith diagram for a premium plan that comprises a dimple 1414. The dimple allows the insurance company to anchor a reference premium, such as the Guaranteed Cost premium (p=1.00) at a particular CDF (e.g. 0.5). This plan also anchors the minimum premium 1412 at the Basic. A sales person presenting this plan to a potential insured has the option of independently lowering the maximum 1418 by increasing the intermediate values 1416 of the plan while at the same time keeping minimum pinned at the Basic and the median (CDF=0.5) pegged at the Guaranteed Cost premium. Thus, compared to conventional linear retrospective plans, this plan offers a lower maximum for the same Basic and Guaranteed Cost premium.

Example 1

Company A applies for workers compensation insurance coverage from insurance carrier B. Company A has expected annual losses of $162,513. This places them in Expected Ultimate Loss Group 55. They would normally qualify for a Guaranteed Cost Premium plan but would be too small for any available linear retrospective premium plan.

Reinsurer C, however, offers a reinsurance participation plan to Company A through Insurance Carrier B's sales force. The reinsurance participation plan stipulates that Company A will receive a discount if its losses are low but will be liable for a surcharge if its losses are high. The company must also commit to participating in the plan for 3 years.

In order to provide premium versus loss data to Company A (the prospective insured), an insurance agent for Insurance Carrier B inputs Company A's expected annual losses and other necessary information, such as number employees, work type, etc., into an input device, such as a laptop computer. The laptop computer then determines the EULG for Company A.

The laptop computer has been specifically modified to calculate the premium versus loss data by at least appropriate programming and downloading of necessary data, such a Table M. The laptop calculates the premium versus loss data such that the data is described by the equation:

premium=basic*VC(actual_losses)*actual_losses

Where:
premium is a premium;
basic is a Basic;
actual_losses is an actual loss; and
VC(actual_losses) is a Variable Loss Conversion Factor Function that describes the variation of a Loss Conversion Factor with respect to actual losses.

VC(actual_losses) may be provided as a look-up table or analytic or other function. If VC(actual_losses) is provided as a look-up table, then interpolation or other smoothing may be used to estimate values between table values.

Premium versus loss data is presented to the prospective insured using an output device (e.g. said laptop). The premium ("Collectible Premium") versus loss data ("Actual Losses") for this example is presented in Table 2 along with the corresponding Loss Conversion Factors.

TABLE 2

Retrospective Premium Plan with Variable Loss Conversion Factor

| Actual Losses | Collectible Premium | Loss Conversion Factors |
| --- | --- | --- |
| $0 | $124,179 | |
| $16,370 | $142,089 | 1.09 |
| $24,278 | $146,608 | 0.92 |
| $32,187 | $150,005 | 0.80 |
| $40,095 | $153,386 | 0.73 |
| $49,133 | $155,645 | 0.64 |
| $57,041 | $157,904 | 0.59 |
| $64,989 | $160,164 | 0.55 |
| $72,858 | $161,301 | 0.51 |
| $80,766 | $163,561 | 0.49 |
| $88,674 | $165,820 | 0.47 |
| $102,231 | $183,796 | 0.58 |
| $121,437 | $203,107 | 0.65 |
| $142,902 | $212,144 | 0.62 |
| $167,757 | $213,265 | 0.53 |
| $194,871 | $213,265 | 0.46 |
| $223,114 | $214,387 | 0.40 |
| >$223,114 | $214,387 | NA |

The minimum premium for no actual loses is $124,179. The maximum premium for losses greater than $223,114 is $214,387. The corresponding Guaranteed Cost premium is $162,513.

FIG. 15A illustrates the Variable Loss Conversion Factor Function 1500 versus actual losses for this example. The Loss Conversion Factors range from 0.4 to 1.09. This is a factor of more than 2.5 (1.09/0.4=2.7). The smallest change in Loss Conversion Factor is from 0.49 to 0.47. This corresponds to about a 4% change (0.49/0.47=1.038). Benefits can be achieved even if the change in loss conversion factor is as small as 1%.

The Variable Loss Conversion Factor Function actually increases 1501 with increasing actual losses for an intermediate range of actual losses. This is manifested as a dimple in a plot of premium versus actual losses (item 624, FIG. 6 and item 1546, FIG. 15C). The increase in Variable Loss Conversion Factor over a range of actual losses allows for a lower maximum premium because more premium is collected from said intermediate range than if said Loss Conversion Factors were not allowed to increase. In this example, the intermediate range is set to begin at about the ½ of the expected annual losses ($88,674/162,513=0.55), and end at about 0.8 times the expected annual losses ($121,437/$162,513=0.75) that correspond to the EULG. This allows the prospective insured to more readily compare this offering with a standard Guaranteed Cost policy. The intermediate range can also be over different ranges depending upon the needs of the prospective insured.

The premium is constant for losses greater than $223,114. The Loss Conversion Factor is not applicable in this range.

FIG. 15B presents a Smith diagram for a premium ratio function used to determine at least in part the premium versus loss data of Table 2. The Smith diagram shows the premium ratio versus Cumulative Distribution Function, said Cumulative Distribution Function being with respect to actual losses of insured with a given EULG.

The premium ratio function has a minimum 1502, a first CDF range 1504, a dimple 1506, and a second CDF range 1508, with a horizontal maximum 1512.

The first CDF range is from 0 to about 0.6. A suitable equation for describing the premium ratio over said first range is:

$$p = A*CDF + p_o$$

Where:
p is the premium ratio;
CDF is the Cumulative Distribution Function;
A is the increase in p for a unit increase in CDF; and
$P_o$ is the premium ratio at CDF=0
In this example A is about 0.4 and $P_o$ is about 0.8.

The second CDF range of from about 0.6 to about 0.8. A suitable equation for describing the premium ratio function over said second range is:

$$p = (P_1 - P_2)*(1 - \exp(-(CDF - CDF_o)/CDF_*)) + P_1$$

Where:
p is the premium ratio;
CDF is the Cumulative Distribution Function;
$P_1$ is the premium ratio at the start of the second CDF range;
$P_2$ is the premium ratio at the end of the second CDF range;
$CDF_o$ is the CDF at the start of the second CDF range; and
$CDF*$ is a curvature parameter indicating how quickly p changes from $P_1$ to $P_2$
In this example, $P_1$ is about 1.0, $P_2$ is about 1.3, and $CDF*$ is about 0.05.

The salesperson presenting the plan to the company can independently vary the parameters of the height of the dimple, the maximum and the total height 1516 of the premium plan in response the company's requirements even after the insurance carrier has underwritten the company. The software presenting the premium versus loss data to the company can alter the curvature of the premium ratio function over the second CDF range as the sales person adjusts the parameters so that the total area under the curve falls within a desired range.

The sales person presenting the plan also has the option of adjusting the area under the curve to be somewhat larger or smaller than unity by adjusting the total height of the curve 1516. The sales person is subject to the constraint, however, that the sum of the premium weighted areas for his/her total book of business (i.e. the other companies that the sales person has signed up) average to unity plus or minus a small percentage, such as 5%. Thus a sales person can provide discounts in certain competitive situations provided those discounts are matched by more profitable pricing as other competitive situations allow. The insurance carrier will then collect enough premium overall to cover expenses and claims.

The insurance sales person presenting the reinsurance participation plan to the company uses a particular machine to calculate a set of losses versus premiums in real time. The particular machine comprises a work station located with the sales person and a pricing server which may be located remotely. The communications link between the work station and the pricing server has sufficiently high bandwidth so that the sales person can present data in real time (e.g. lags of less than 10 seconds). The pricing server has the pricing algorithms including the premium ratio curve as well as loss ratio curve. The workstation receives input data from the company and transmits said data to the pricing server. The pricing server selects the appropriate loss distribution 1522, and determines a set of loss ratio 1526 and corresponding premium ratio 1528 pairs wherein the loss ratio and premium ratio in each pair have the same CDF to within a suitable accuracy, such as +/−5 percent. This information is then transmitted to the workstation.

FIG. 15C presents the loss ratio/premium ratio pairs for the data presented in Table 2 above. The Basic 1542, dimple 1546, and maximum 1552 are positioned where expected.

Company A considers itself safer than its peers and is pleased with the opportunity to save up to 20% in its premium. It elects to purchase the policy and commit to the three year term of the reinsurance participation plan.

Detect and Correct for Adverse Selection

Allowing the insured to adjust the premium ratio curve to best meet its needs can help an insurance carrier detect and correct for adverse selection. Adverse selection means that the company has better information about its future losses than the insurance carrier has and can therefore select a form of coverage that may not leave the insurance company with enough premium to cover claims and expenses. For example, a company that anticipated higher than normal losses in a given year might select a premium plan that had a very low maximum cap but a high Basic. Companies that anticipated lower than normal losses might select plans with very low Basics but high maximum caps.

In principle, it should not matter what premium plan a company selected if the insurance carrier has done the proper job of underwriting. As a practical matter, however, the company has more information about its future plans and operations than the insurance carrier does, so the carrier's underwriting may have a systematic error.

Adverse selection may be compensated for at least in part by adjusting the overall area under the premium ratio curve in a Smith diagram in response to the choices a prospective insured makes. The area might be increased (i.e. more premium on average) if a company was a bit too concerned about the maximum premium. Conversely, it might be acceptable to decrease the area if the company exhibited very little concern about the maximum premium.

These adjustments can be made by the sales software.

Synergies with Bundled Employee Services

There are surprising synergies when employee services are bundled with the insurance coverages and participation plans described herein. This is particularly true if the employee services are payroll payment services.

It has been discovered that the data available from employer payroll services can be used to assess risk and to reduce fraud in workers' compensation insurance. This fraud might be on the part of the insured company. There are very large differences between required insurance premiums for high risk occupations and low risk occupations. There is a motivation, therefore, for insured companies to incorrectly categorize the occupations of its employees in order to obtain a rate reduction. This, however, can result in an imbalance in payroll. The payroll company can detect this and the insurance carrier, in turn, can insist that the insured company have the correct job classification codes for its employees and thus collect the appropriate amount of premium.

Other Insurance Coverages

The non-linear retrospective premium plans and reinsurance participation plans can be applied to other insurance coverages, such as general liability, professional liability, auto, health and others as long as appropriate loss ratio data is available or calculable.

CONCLUSION

As used herein, the terms "about", "approximately", and their synonyms mean within plus or minus 10 percent of a given value, unless explicitly indicated otherwise or indicated otherwise by the context in which they are used.

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

The invention claimed is:

1. A computer based system for providing to a prospective insured a set of premium versus loss data for a reinsurance participation plan for workers compensation insurance coverage, said system comprising:
   a. an input device for receiving data about said prospective insured, said data being sufficient to categorize said prospective insured into an Expected Ultimate Loss Group, EULG;
   b. a first computer configured to calculate said set of premium versus loss data for said EULG, said premium versus loss data being described by the equation:

premium=basic+VC(actual_losses)*actual_losses where:
   i. premium is a premium in said set of premium versus loss data;
   ii. basic is a Basic;
   iii. actual losses is an actual loss in said set of premium versus loss data; and
   iv. VC(actual_losses) is a Variable Loss Conversion Factor Function that increases with increasing actual losses for an intermediate range of said actual losses so that the maximum value of said premiums in said set of premium versus loss data is less than the maximum premium of a linear retrospective premium plan with the same Basic and EULG; and
   c. an output device for presenting said set of premium versus loss data to said prospective insured;
   and wherein said computer based system further comprises a second computer configured to calculate said set of premium versus loss data using the equation:

premium=$p$(CDF)*GuaranteedCostpremium or its equivalent, where:
   $p$(CDF) is a premium ratio function which is defined as the ratio of premium to GuaranteedCostpremium for a given CDF;
   CDF is a value of the Cumulative Distribution Function of losses for insureds with said EULG; and
   GuaranteedCostpremium is a Guaranteed Cost premium for said EULG;
   and wherein said premium ratio function is approximately described over a first CDF range by the equation:

$p$(CDF)=$A$*CDF+$p_o$ where:
   CDF is greater than zero and less than one;
   $A$ is a non-zero slope of said premium ratio function in said first CDF range; and
   $p_o$ is the intercept of said premium ratio function in said first CDF range.

2. The computer based system of claim 1 wherein said intermediate range begins at about ½ of the expected annual losses that correspond to said EULG.

3. The computer based system of claim 1 wherein:
said first CDF range is from about 0.0 to about 0.6;
$A$ is about 0.4; and
$p_o$ is about 0.8.

4. A computer based system for providing to a prospective insured a set of premium versus loss data for a reinsurance participation plan for workers compensation insurance coverage, said system comprising:
   a. an input device for receiving data about said prospective insured, said data being sufficient to categorize said prospective insured into an Expected Ultimate Loss Group, EULG;
   b. a first computer configured to calculate said set of premium versus loss data for said EULG, said premium versus loss data being described by the equation:

premium=basic+VC(actual_losses)*actual_losses where:
   i. premium is a premium in said set of premium versus loss data;
   ii. basic is a Basic;
   iii. actual losses is an actual loss in said set of premium versus loss data; and
   iv. VC(actual losses) is a Variable Loss Conversion Factor Function that increases with increasing actual losses for an intermediate range of said actual losses so that the maximum value of said premiums in said set of premium versus loss data is less than the maximum premium of a linear retrospective premium plan with the same Basic and EULG; and
   c. an output device for presenting said set of premium versus loss data to said prospective insured;
   and wherein said computer based system further comprises a second computer configured to calculate said set of premium versus loss data using the equation:

premium=$p$(CDF)*GuaranteedCostpremium or its equivalent, where:
   $p$(CDF) is a premium ratio function which is defined as the ratio of premium to GuaranteedCostpremium for a given CDF;
   CDF is a value of the Cumulative Distribution Function of losses for insureds with said EULG; and
   GuaranteedCostpremium is a Guaranteed Cost premium for said EULG:
   and wherein said premium ratio function is approximately described over a first CDF range by the equation:

$p$(CDF)=$(P_1-P_2)$*$(1-\exp(-(CDF-CDF_o)/CDF_*))$+$P_1$ where:
   $P_1$ is the value of the premium ratio function at the start of said first CDF range;
   $P_2$ is the value of the premium ratio function at the end of said first CDF range;
   $CDF_o$ is the CDF at the start of said first CDF range; and
   $CDF^*$ is a curvature parameter indicating how quickly the premium ratio function changes from $P_1$ to $P_2$ in said first CDF range.

5. The computer based system of claim 4 wherein:
said first CDF range is from about 0.6 to about 0.8;
$P_1$ is about 1.0;
$P_2$ is about 1.3; and
$CDF^*$ is about 0.05.

6. The computer based system of claim 1 wherein said first computer and said second computer are the same computer.

7. The computer based system of claim 4 wherein said first computer and said second computer are the same computer.

8. The computer based system of claim 4 wherein said intermediate range begins at about ½ of the expected annual losses that correspond to said EULG.

* * * * *